United States Patent [19]

Wilson, Jr.

[11] Patent Number: 4,680,428

[45] Date of Patent: Jul. 14, 1987

[54] ELECTRIC FENCE INSULATOR CAP

[75] Inventor: Robert M. Wilson, Jr., Battle Creek, Mich.

[73] Assignee: Dare Products, Inc., Battle Creek, Mich.

[21] Appl. No.: 899,164

[22] Filed: Aug. 22, 1986

[51] Int. Cl.[4] ........................ H01B 17/14; A01K 3/00

[52] U.S. Cl. ................................ 174/158 F; 52/301; 174/175; 256/10

[58] Field of Search ............. 174/45 R, 158 F, 161 F, 174/163 F, 175; 52/244, 300, 301; 256/10

[56] References Cited

U.S. PATENT DOCUMENTS 4,520,231 5/1985 Hubbell .......................... 174/158 F 4,623,756 11/1986 Wilson, Jr. ..................... 174/158 F

*Primary Examiner*—Laramie E. Askin

*Attorney, Agent, or Firm*—Irvin L. Groh

[57] ABSTRACT

An electric fence insulator cap for mounting on U-posts of varying flange tip to flange tip widths and varying bight to flange depth in either of two 180° oriented positions. The electric fence wire is held in a pair of slotted lugs for simple installation. The cap top is generally sloped to deflect rain with a central flat surface for impacting installation on the fence post.

4 Claims, 5 Drawing Figures

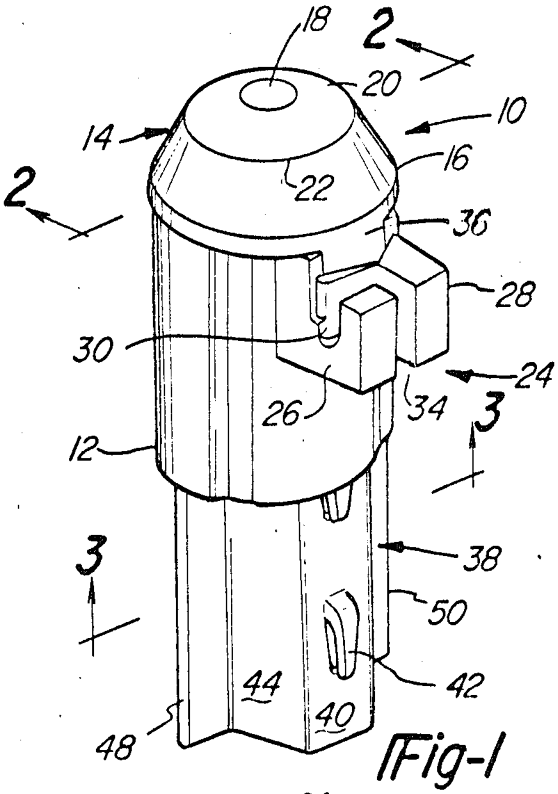
Fig-1
Fig-2
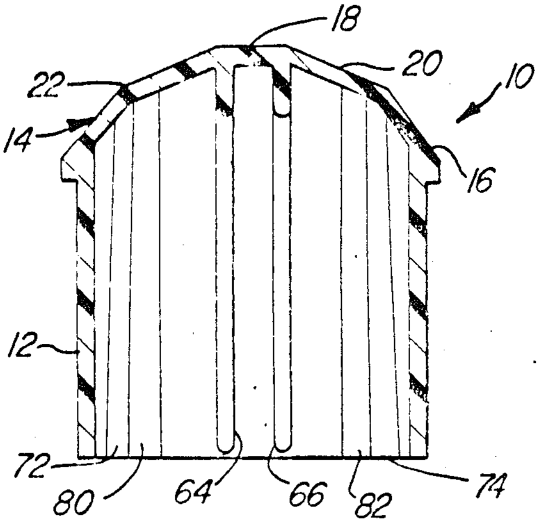
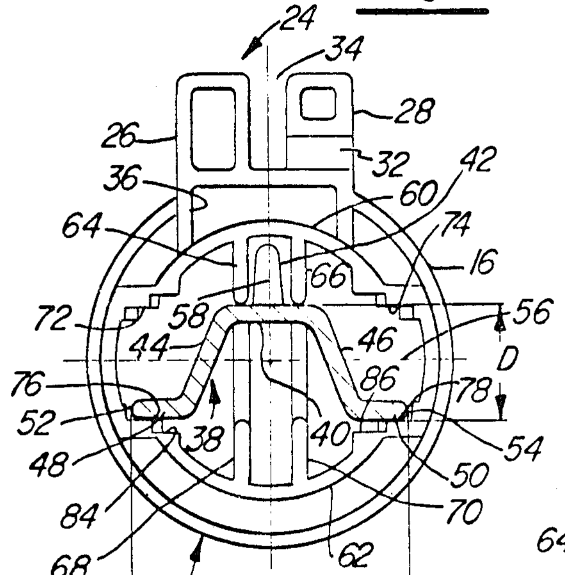
Fig-3
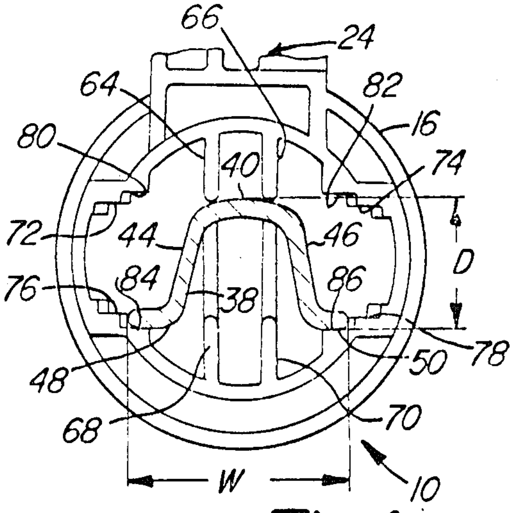
Fig-4
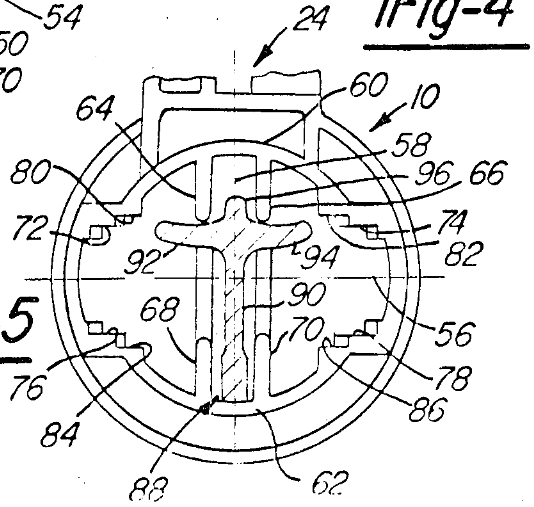
Fig-5

ELECTRIC FENCE INSULATOR CAP

This invention relates to electric fence insulators, and, more particularly, to an insulator cap for installation on top of a U-post of various sizes. Secondarily, this same cap can be mounted on the most common sizes of studded fence posts.

There is a wide variety of insulators available for mounting on a fence post of various configurations to constitute an electric fence installation. For example, Johnson U.S. Pat. No. 2,396,512 illustrates a clamping type insulator for mounting at an intermediate point or on the top of an angle iron post; Meinen U.S. Pat. No. 2,756,969 and Beebe U.S. Pat. No. 3,562,407 show collars for mounting on round posts, also at an intermediate point or at the top thereof; Numsen U.S. Pat. No. 2,801,277 and Wilson U.S. Pat. No. 4,077,611 teach clips for installation on an angle iron, or T-post as well as on a U-post with or without laterally extending flanges.

There are a few number of insulators for mounting on the top of fence posts, even though this type of insulator is highly desirable. For example, with a smooth surface cap, protection is provided for animals being constrained and for personnel who might otherwise incur injury due to their contact with the fence post top, particularly when the animal is being shocked or contact is by some accidental occurrence. Kersten U.S. Pat. No. 2,721,891 shows a cap type of insulator for installation on a round rod type of post where the insulating cap is sized for a specific diameter round rod. Hubbell U.S. Pat. No. 4,520,231 shows an insulated cap for installation on a single size T-post in one of two 180° opposing orientations. My patent application, Ser. No. 766,716 filed Aug. 19, 1985, now U.S. Pat. No. 4,623,756, shows an insulator cap design to universally accept various sizes and configurations of T-posts in any one of four, 90° separated, positions.

It is a primary objective of this invention to provide an insulating cap for engagement with a fence post having a U-shape configuration with laterally extending flanges.

Flanged U-post stock is commonly formed from hot-rolled and cold-rolled steel stock with two different configurations. The cold-rolled U-post has a narrower flange tip to flange tip width and a deeper front to back, bight to flange bottom, depth as compared to the hot-rolled U-post which has a wider flange tip to flange tip width and a shallower front to back, bight to flange bottom, depth.

It is another object of this invention to provide an insulating cap which will accomodate the different sizes and configurations of commercially available U-post material.

It is still another object of this invention to provide an insulating cap capable of accommodating the various commercially available sizes and configurations of U-posts in either of two 180° spaced orientations.

A secondary object of this invention is to provide an insulating cap primarily designed for installation on a U-post, but that can also be mounted on the most common sizes of T-posts.

The foregoing objects and other advantages have been accomplished in a cap with an attractive appearance whhich can be installed by simple hammer impact on its top. Such installation provides wedging or squeezing retention of the cap on the post.

The cap is molded from a weather-proof, electrically insulating, high impact plastic such as polyethylene. The cap includes a tubular body having a sloped top closing one end of the body. The sloped top is constructed with a skirt portion overlying the outside of the tubular body. Preferably, the top is sloped or rounded in overall configuration with a central flat portion designed to receive hammer blows as the insulating cap is installed on the U-post. In the preferred form, the sloped surface in conjunction with the flat central portion has the shape of a truncated cone of a wide angle which joins a deeper sloped surface extending to the lower end of the skirt surface. This sloped or rounded configuration provides means for shedding water.

The U-post has legs which diverge from a central flat bight portion to outwardly or laterally extending flanges in a plane parallel to the central bight portion. The bight portion has longitudinally spaced outwardly extending fastening lugs or clips designed to hold the wire fencing or tie members to the fence.

The tubular body of the fence post cap has an oblong cross-section with its wall symmetrical about a longer and a shorter axis at right angles to each other. Two opposed pairs of adjacent longitudinally extending parallel ribs project inwardly from the wall with one rib of each pair being on each side of the shorter axis. The ribs of each pair are spaced apart a distance sufficient to receive the fastening lug extending from the bight portion of the U-post. Stepped ledges extend inwardly from the wall symmetrically arranged on both sides of the shorter and the longer axes and parallel to the longer axis. When the cap is driven onto the U-post by impacting the top, at least one of the ribs contacts the flat bight portion of the post, and ne of the stepped ledges contacts each of the post flanges for guiding the cap onto the post. The cap is then retained on the post by the coaction of the cap wall against the ends of the post flanges or the coaction of at least one of the ribs acting on the bight portion of the post and the stepped ledges acting on the flanges of the U-post.

The stepped ledges include four inner ledges, one on both sides of the shorter axis and on both sides of the longer axis arranged in working pairs on both sides of and parallel to the longer axis. The stepped ledges also include four outer ledges, one on both sides of the short axis and on both sides of the longer axis also arranged in working pairs on both sides of and parallel to the longer axis. The inner ledges are closer to the longer axis than the outer ledges and the outer ledges extend inwardly closer to t he short axis than the inner ledges. Normally, both of the ribs of a pair of ribs will contact the flat bight portion of the U-post while both of its flanges will contact an aligned pair of inner or outer ledges for guiding the U-post into the cap.

The cap includes wire retention means which extends outwardly from one side of the tubular body aligned with the short axis and with the two pairs of ribs. This wire retention means preferably takes the form of a pair of axially extending outwardly projecting parallel lugs aligned parallel with the pair of internal ribs. One of the lugs has an upwardly open slot and the other of the lugs has a downwardly open slot to accommodate a wire extending perpendicularly through the slots. The wire retention means can be oriented in a slected one of two 180° spaced positions to receive the wire prior to the cap being driven onto the U-post.

The conventional cold-rolled U-post is narrower than the hot-rolled post so that its flanged tips will not engage the inside cap wall, but it has a deeper front to back depth than the hot-rolled U-post so that a pair of ribs will engage the bight pportion and the flanges will be engaged by a pair of outer ledges to retain the post wedged therebetween. With a conventional hot-rolled U-post the front to back depth is less than the cold-rolled post so that the post will be guided between a pair of ribs and a pair of inner ledges engaging the flanges while the flange ends will contact the tube wall in wedging engagement. Other sizes and configurations, such as those that have generally been discontinued, may be accommodated by a slight skewing of the U-post so that one of the ribs contacts the bight portion while one of the flanges contacts an inner ledge and the other flange contacts an outer ledge.

The curvature between adjacent ribs of each pair of ribs is such as to accommodate the web of a studded T-post so that the cap can accommodate and be driven onto the T-post with one pair of ribs receiving the web of the T-post and the other pair of ribs receiving the stud of the T-post. The T-post being guided and retained by the coaction of one pair of ribs contacting the outer surface of the T-post flanges and the end of the T-post web contacting the wall between the other pair of ribs.

The objects of this invention are accomplished by the embodiment disclosed in the following description and illustrated in the drawing in which:

FIG. 1 is a perspective view of the insulating cap of the present invention installed on a U-post with the wire engaging lugs facing outward in the same direction as the fastening lugs extending outwardly from the bight portion of the U-post;

FIG. 2 is a side elevation partially in section showing the insulating cap of this invention taken along the longer oblong cross-section axis on line 2—2 of FIG. 1.

FIGS. 3–5 are bottom views of the cap looking in the direction of line 3—3 in FIG. 1, showing the circular configuration of the cap top and the oblong configuration of the tubular body and the orientation of the wire retention lugs relative to the pairs of the inner ribs wherein;

FIG. 3 shows a flanged hot-rolled U-post being guided by a pair of ribs acting against the bight and the inner ledges acting against the flanges of the U-post while the ends of the U-post flanges are being wedged against the body wall;

FIG. 4 shows a flanged cold-rolled U-post being guided and retained in wedging relationship between a pair of ribs engaging the bight portion and a pair of outer ledges engaging the flanges of the U-post; and FIG. 5 shows the insulating cap of this invention as being applied to a studded T-post in which the post is guided and retained by the coaction of the ends of a pair of ribs acting against the outer surface of T-post flanges and the end of the T-post web contacting the body wall between the other pair of ribs.

The electric fence insulator cap 10 of this invention is molded as an integral one-piece structure from a weather-proof, electrically insulating, resilient, high-impact plastic such as polyethylene. Cap 10 has a tubular body portion 12 which is closed at one end by a sloped rounded top 14 with a skirt portion 16 overhanging or overlying the tubular body portion 12. As shown in FIGS. 1 and 2, in the preferred embodiment the rounded or sloped top 14 is formed with a flat central portion 18 designed to receive hammer blows as the cap is installed on the U-post. The cap slopes downwardly from the flat portion with a wide angle conical surface 20 to a hip line 22 from which the skirt portion 16 depends at a steeper angle. The circular skirt portion 16 overhangs the tubular wall portion 12 at all points even though the tubular portion is oblong in cross-section so as to provide an esthetically pleasing appearance and to shed rainwater easily.

Wire retention means 24 is provided in the form of a pair of spaced lugs 26 and 28 which project outwardly from the tubular body 12 in parallel alignment with each other and with the two pairs of internal ribs, as will be explained. One of the lugs, in the example shown, has an upwardly opening slot 30 while the other lug 28 has a downwardly opening slot 32 to accommodate a wire extending perpendicularly through both slots.

Lugs 26 and 28 are spaced apart a distance 34 to permit a horizontally strung wire to pass between them as the cap is held with its axis in a horizontal position. This allows the wire to slip into both slots 30 and 32 as the cap is rotated to a vertical position for attachment to the fence post. The axial extents of the slots overlap each other to accommodate the wire passing through both slots. As can best be seen in FIG. 1, lugs 26 and 28 extend outwardly from a boss 36 which in turn extends outwardly from tubular body 12 and downwardly from skirt portion 16 of the sloped top 14.

The flanged U-shaped fence post 38 has a central bight portion 40 with longitudinally spaced outwardly extending fastening lugs or clips 42 which may be used to fasten or otherwise secure the fence material to the post. U-post legs 44 and 46 diverge form the central bight portion 40 laterally to outwardly extending flanges 48 and 50. In order to accommodate the flanged U-shaped post configuration which has a width, W, from the ends 52 and 54 of flanges 48 and 50, respectively, which is wider than the depth, D, from the bight portion 40 to the bottom of flanges 48 and 50, the body portion 12 of the cap is made with an oblong cross-section having a longer axis 56 along which the width, W, of the post extends and a shorter axis 58 along which the smaller depth dimension, D, of the U-post extends.

Extending inwardly from circular portions 60 and 62 of the body wall are two pairs of ribs 64, 66 and 68, 70 which are parallel and extend along the shorter axis 58 which is also in line with the wire retention means 24. One of the pairs 64, 66 or 68, 70 will engage the bight portion 40 of the U-post 38 depending upon which of two 180° spaced orientations is selected as the cap is driven onto the post for the desire alignment of the wire retention means 24. One of the ribs, 64 in the example shown, projects outwardly from wall portion 60 on one side of the shorter axis 58 and the other rib 66 projects outwardly from the wall pportion 60 on the other side of the shorter axis 58 to constitute the pair of ribs 68, 70 located on the other side of longer axis 56 projecting inwardly from wall portion 62 with the one rib 68 on one side of the shorter axis 58 and the other rib 70 on the other side of the shorter axis 58. Both pairs of ribs are spaced apart a distance sufficient to receive the fastening lugs 42 therebetween.

Stepped ledges extend inwardly from the body wall 12 symmetrically arranged on both sides of the shorter axis 58 and the longer axis 56. The ledges are arranged parallel to the longer axis 56 and cooperate in pairs, one ledge of each of the pairs being on either side of the shorter axis 58 to engage the U-post flanges 48 and 50.

As can be seen in FIGS. 3–5, four inner ledges which are closer to the longer axis 56 are arranged parallel to the longer axis 56 in pairs and include ledge 72 to the left of shorter axis 58 and ledge 74 to the right of shorter axis 58 parallel to and above the longer axis 56. Likewise, the pair of ledges 76, 78 are arranged with ledge 76 on the lefthand side of the shorter axis 58 and the ledge 78 located on the righthand side of the shorter axis 58, both below and parallel to the longer axis 56. In a similar manner, four outer ledges are arranged parallel to and farther from the longer axis 56 than the inner ledges. The outer ledges comprise an upper pair 80, 82, and a lower pair 84, 86 as viewed in FIGS. 3–5.

When the cap 10 is arranged with the wire retaining lugs 26 and 28 directed in one of the two possible orientations, either extending outwardly in the same direction as clips 42 are extending or in an opposite direction away from the bight portion 40, the cap is driven onto the post, being guided by the coaction of one of the pairs of ribs 64, 66 or 68, 70 with the bight portion 40 of the post and the flanges 48 and 50 coacting with a pair of inner or outer ledges.

As seen in FIG. 3, a hot-rolled U-post has its bight portion 40 contacting parallel ribs 64, 66 and its flanges 48 and 50 riding along lower inner ledges 76 and 78 to guide the cap 10 onto the channel 38. Flanged ends 52 and 54 engage the inner wall of body 12 for wedging retention.

FIG. 4 shows a cold-rolled U-post being guided into cap 10 by the coaction of ribs 64 and 66 acting against bight portion 40 with flanges 48 and 50 riding on the outer lower ledges 84 and 86. Wedging retention in this case occurs between the ribs 64 and 66 and the lower outer ledges 84 and 86. As can be seen in FIG. 2, the ends of the upper inner ledges 72, 74 and the ends of the upper outer ledges 80 and 82 taper inwardly as they approach the top of the cap so as to ensure, for example, the wedging retention of the hot-rolled U-post shown in FIG. 3 at the ends 52 and 54 of flanges 48 and 50. The lower inner and outer ledges have a similar taper towards the cap top.

As shown in FIG. 5, cap 10 can likewise be mounted on a studded T-post 88. The T-post 88 has a stem or web 90 and a cross member consisting of flanges 92 and 94. Studs or lugs 96 extend from the flanged end of the T-post to serve as mounting lugs similar to the clips 42 on U-post 38. When the cap 10 is driven onto the top of the T-post 88, the ends of one pair of ribs 64, 66 or 68, 70 act against the face of flanges 92 and 94 while the web member 88 extends between the other pair of ribs to be wedged against the circular wall portion 60 or 62 of the cap body between the ribs. The T-post studs 96 will be accommodated between the flange engaging ribs.

The embodiments of the invention which an exclusive property or privilege is claimed are defined as follows:

1. A fence post cap for installation on the top of a U-post, said U-post having legs which diverge from a central flat bight portion to outwardly extending flanges in a plane parallel to said central bight portion, said bight portion having longitudinally spaced outwardly extending fastening lugs, said cap comprising: a tubular body having an oblong cross-section with its wall symmetrical about a longer and a shorter axis at right angles to each other; a sloped top closing one end of said tubular body; two opposed pairs of adjacent longitudinally extending parallel ribs projecting inwardly from said wall parallel to said shorter axis with one rib of each pair being on each side of said shorter axis, the ribs of each pair being spaced apart a distance sufficient to receive a fastening lug therebetween; stepped ledges extending inwardly from said wall symmetrically arranged on both sides of said shorter and longer axes and parallel to said longer axis; whereby said cap can be driven onto said U-post by impacting said top, at least one of said ribs then contacting the flat bight portion of said post and each of said post flanges then contacting one of said stepped ledges for guiding said cap, and said cap then being retained on said post by the coaction of the cap wall against the ends of said flanges or the coaction of at least one of the ribs acting on the bight portion and the stepped ledges acting on the flanges of said U-post.

2. The fence post cap of claim 1 further including wire retention means extending outwardly from one side of said tubular body aligned with said shorter axis and said ribs whereby said wire retention means can be oriented in a selected one of two 180° spaced positions to receive a wire prior to said cap being driven onto said U-post.

3. The fence post cap of claim 1 wherein said stepped ledges include four inner ledges, one on both sides of said shorter axis and on both sides of and said longer axis, arranged in working pairs on both sides of and parallel to said longer axis and said stepped ledges also including four outer ledges, one on both sides of said shorter axis and on both sides of said longer axis, arranged in working pairs on both sides of and parallel to said longer axis, said inner ledges being closer to said longer axis than said outer ledges and said outer ledges extending inwardly closer to said shorter axis than said inner ledges, whereby both of said ribs of a pair of ribs will contact said flat bight portion of said post as both of said flanges will contact an aligned pair of inner or outer ledges for guiding said U-post into said cap.

4. The fence post cap of claim 1 wherein said tube wall has a curvature between adjacent ribs of each pair of ribs to accommodate the web of a studded T-post so that the cap can be driven onto a studded T-post with one pair of ribs receiving the web of a T-post therebetween and the other pair of ribs receiving the sutd of said T-post therebetween, the T-post being guided and retained by the coaction of one pair of ribs contacting the outer surface of the T-post flanges and the end of the T-post web contacting said wall between the other pair of ribs.

* * * * *